(No Model.)
G. T. JOBSON.
WHEEL FOR VEHICLES.
No. 496,226. Patented Apr. 25, 1893.
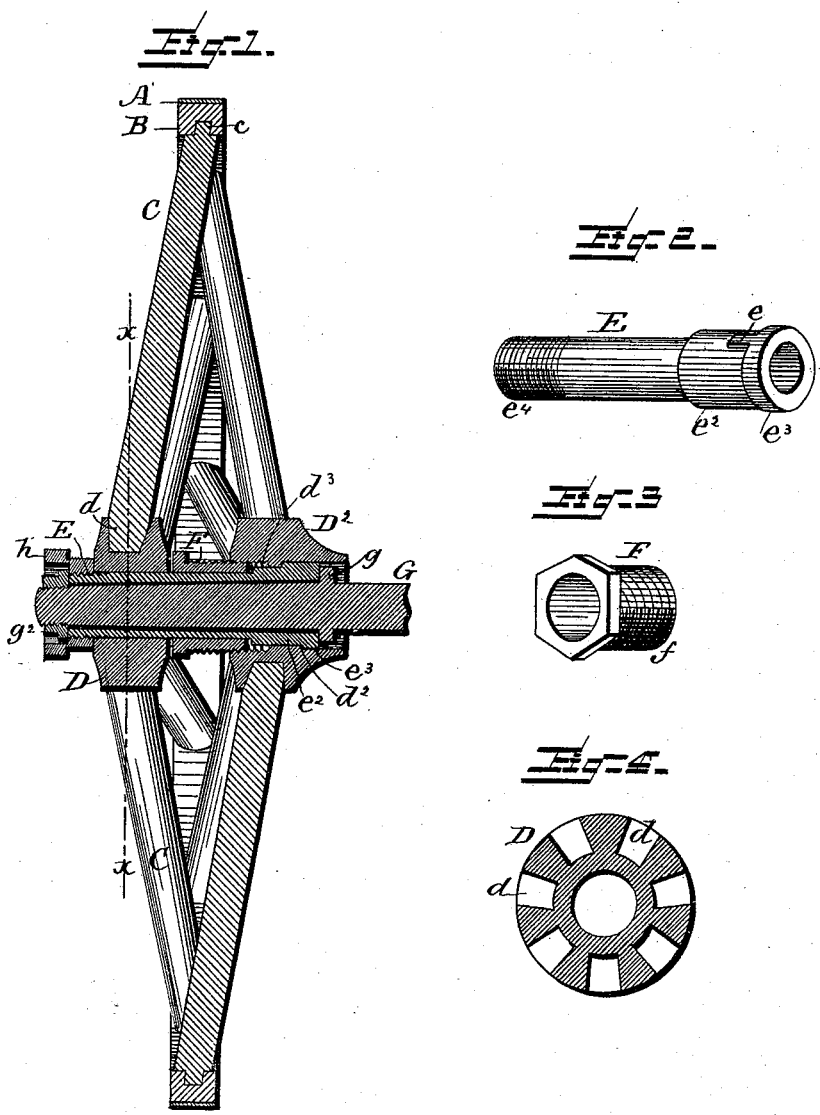
WITNESSES
A. B. Degges
J. J. Masson
INVENTOR
Giles T. Jobson,
by E. E. Masson, Attorney

UNITED STATES PATENT OFFICE.

GILES T. JOBSON, OF AUGUSTA, GEORGIA.

WHEEL FOR VEHICLES.

SPECIFICATION forming part of Letters Patent No. 496,226, dated April 25, 1893.

Application filed January 26, 1893. Serial No. 459,792. (No model.)

*To all whom it may concern:*

Be it known that I, GILES T. JOBSON, a citizen of the United States, residing at Augusta, in the county of Richmond, State of Georgia, have invented certain new and useful Improvements in Wheels for Vehicles, of which the following is a specification, reference being had therein to the accompanying drawings.

This invention relates to vehicle-wheels having a metallic hub and staggered spokes; and the objects of my improvement are to provide simple and inexpensive means to tighten the parts of the wheel together when they have become shrunken, and to have the hub-disks of one set of spokes supported by the hub-disks of the adjacent set and thus prevent racking of the wheel under lateral oscillations caused by ruts in rough roads. I attain these objects by the construction illustrated in the accompanying drawings in which—

Figure 1 is a transverse vertical section of a vehicle-wheel constructed in accordance with my invention. Fig. 2 is a perspective view of the hub thimble. Fig. 3 is a perspective view of the inner tightening and bracing nut for the hub-disks. Fig. 4 is a transverse vertical section through one of the hub-disks on line $x$ $x$ of Fig. 1.

In said drawings A represents the metal tire, B the felly, and C the spokes, the outer ends of the latter having tenons $c$ that are received in mortises formed in the felly as usual. The inner ends of the spokes are received in pockets $d$ formed into the peripheries of hub-disks D and $D^2$. Each hub-disk is preferably cast in one piece, although it may be made in halves, cut for example on line $x$ $x$ of Fig. 1, and said halves riveted together. The hub-disks are bored centrally, and within them, the thimble E is made to fit, but to prevent it from rotating therein, it has on its periphery a feather $e$ adjacent to its inner end, that is received into a corresponding groove within the eye of the disk $D^2$. Said eye is of larger diameter than the eye of the disk D so as to receive the inner end of a tightening screw F intermediate of the disks D, $D^2$. The thimble E is therefore provided with a reinforcing collar $e^2$ that is received within the eye of the disk $D^2$, and with a collar $e^3$ of still larger diameter at its inner end; the said collar $e^3$ being made to abut against a circular shoulder $d^2$ formed within the eye of the disk $D^2$ to permit the latter to be drawn toward the disk D by means of a band-nut $h$ the thread of which is in engagement with the screw thread $e^4$ on the outer end of the thimble.

To adjust the disk $D^2$ toward, or away from the disk D, the inner end of the eye of said disk $D^2$ is internally screw threaded at $d^3$ to receive the threaded end $f$ of the tubular screw F that is mounted loosely upon the central portion of the thimble E. Within this thimble is placed one end of the axle G that is provided with a collar $g$ as usual, and receives on its outer end a nut $g^2$ that retains the axle within the hub of the wheel.

The tire of a wheel provided with a hub as above described can be set tightly upon the felly without heating and shrinking it on. The screw F having one end screwed into the disk $D^2$ is used to force the thimble E outwardly by pressing against the edge of its collar $e^2$, to prevent said thimble from projecting too far through the outer band-nut $h$. To tighten the parts of the wheel, the band-nut $h$ is first slackened; the screw F is then rotated one or more turns, and the band nut $h$ tightened again. By slightly changing the form of the thimble E and of the axle, this wheel will be of suitable construction for wheel-barrows and other single wheel vehicles.

Having now fully described my invention, I claim—

In combination with the tire, felly, and spokes of a vehicle wheel, the hub thereof consisting of a thimble substantially the length of said hub and having collars thereon adjacent to its inner end, a tubular screw F mounted centrally upon said thimble, spoke-receiving hub-disks D and $D^2$ upon said thimble, the inner disk $D^2$ being internally screw tapped to receive the screw F, and the outer band-nut $h$ on the end of the thimble substantially as described.

In testimony whereof I affix my signature in presence of two witnesses.

GILES T. JOBSON.

Witnesses:
RUFUS H. BROWN,
HENRY C. GOODRICH.